United States Patent
Tsutsui et al.

[11] Patent Number: 6,102,830
[45] Date of Patent: Aug. 15, 2000

[54] SHIFT CONTROL DEVICE FOR AUTOMATIC TRANSMISSION

[75] Inventors: Hiroshi Tsutsui; Masaaki Nishida; Yoshihisa Yamamoto; Akitomo Suzuki; Masao Saito, all of Anjo, Japan

[73] Assignee: Aisin AW Co., Ltd., Anjo, Japan

[21] Appl. No.: 09/056,793

[22] Filed: Apr. 8, 1998

[30] Foreign Application Priority Data

Apr. 9, 1997 [JP] Japan ............................ 9-091135

[51] Int. Cl.[7] ................................................ F16H 61/00
[52] U.S. Cl. ........................ 477/143; 477/141; 477/156
[58] Field of Search ........................... 477/143, 144, 477/141, 156

[56] References Cited

U.S. PATENT DOCUMENTS

| | | | |
|---|---|---|---|
| 5,393,275 | 2/1995 | Okada et al. ............................. | 477/81 |
| 5,573,478 | 11/1996 | Tsukamoto et al. ................. | 477/143 X |
| 5,665,027 | 9/1997 | Oba et al. ............................... | 477/109 |
| 5,683,327 | 11/1997 | Inuzuka et al. ......................... | 477/62 |
| 5,800,309 | 9/1998 | Takiguchi et al. .................... | 477/144 |
| 5,803,866 | 9/1998 | Tsukamoto et al. ................... | 477/132 |
| 5,876,301 | 3/1999 | Tabata et al. .......................... | 477/109 |

*Primary Examiner*—Charles A Marmor
*Assistant Examiner*—Ha Ho
*Attorney, Agent, or Firm*—Oliff & Berridge, PLC

[57] ABSTRACT

When a shift to a second gear ratio (second ratio) is determined during a shift control for a first shift (shift from fourth ratio to third ratio), the process status, or circumstances, of the first shift is determined using a hydraulic pressure for a fourth brake being engaged at the determination. When the process status, that is, the process circumstances, is in early phase, the first shift is interrupted and shift control for the direct shift to the second ratio (shift from fourth ratio to second ratio) is performed (first shift pattern). When the process status is in a late phase, the first shift control is continued, and after ending of the first shift control, the control for the shift to the second gear ratio (shift from third ratio to second ratio) is performed (second shift pattern). In the case of power off state, the second shift pattern is performed irrespective of the process status.

14 Claims, 8 Drawing Sheets

FIG. 2

|   | C1 | C2 | C3 | B1 | B2 | B3 | B4 | B5 | F1 | F2 |
|---|---|---|---|---|---|---|---|---|---|---|
| N |  |  |  |  |  |  |  | ○ |  |  |
| 1ST | ○ |  |  |  |  | ◌ |  | ○ |  | ○ |
| 2ND | ○ |  |  | □ | ○ |  |  | ○ | ○ |  |
| 3RD | ○ |  |  | ○ | ○ |  | ○ |  | ○ |  |
| 4TH | ○ |  | ○ | ○ | ○ |  |  |  | ○ |  |
| 5TH | ○ | ○ | ○ |  | ○ |  |  |  |  |  |
| 3Low | ○ | ○ |  |  | ○ |  |  | ○ |  |  |
| 4Low | ○ | ○ |  |  | ○ |  | ○ |  |  |  |
| REV |  | ○ |  |  |  | ○ |  | ○ |  |  |

◌ : Engine Brake    □ : Operated with Necessity

SHIFT CONTROL DEVICE FOR AUTOMATIC TRANSMISSION

BACKGROUND OF THE INVENTION

1. Field of the Invention

The invention relates to an automatic transmission mounted on a vehicle. More specifically, it relates to a shift control device in the case that another shift is determined during an operation of a shift (multiplex shift).

2. Description of the Prior Art

An automatic transmission has a multistage shift capability, for example, five forward ratios and one backward ratio. In the automatic transmission, a shift to another ratio may be determined during an operation of a shift to a predetermined ratio. For example, during the operation of a shift from fourth ratio to third ratio (first shift), wherein a first frictional engagement element (C3 clutch) is disengaged and a second frictional engagement element (B4 brake) is engaged, a shift to second ratio, wherein different predetermined frictional engagement elements are disengaged or engaged (C3 clutch or B4 brake is disengaged and B5 brake is engaged), may be determined.

In this case, as described in Japanese Patent Publication (koukoku) Hei 5-50621, a first shift command is output, it is detected that the operation of the shift to a gear ratio set by the shift command is ended. The end of the operation of the shift is determined by detecting that a rotation speed ratio between an input rotation speed and an output rotation speed of the automatic transmission at the gear ratio set by the shift command is kept around 1.0 for a predetermined time. When a second shift command, which is different from the first shift command, is output between the output of the first shift command and the end of the shift to the gear ratio, an operation of a shift based on the second shift command is not performed. That is to say, when the second shift is determined during the operation of the first shift, the operation of the second shift is prohibited until the operation of the first shift is ended. As such, it prevents engine revving or racing and too great a decrease in engine rotation based on a wrong timing of engagement and disengagement of the frictional engagement elements.

In the aforementioned shift control, especially, when the second shift is determined at an early phase of the operation of the first shift, the shift time from the start of the first shift to the end of the second shift becomes long because the second shift is prohibited until the operation of the first shift is ended.

The determination of the second shift during the operation of the first shift is determined as a jump shift, and it may be intended to interrupt the operation of the first shift and to perform the second shift. In this case, a shift shock results from the engine revving. For example, this may occur because of the nature of the first shift when the operation of the first shift is interrupted and the frictional engagement elements operated in the first shift are returned to a state before the first shift.

SUMMARY OF THE INVENTION

In view of the above problems associated with the aforementioned shift control, an object of the invention is to provide a shift control device for an automatic transmission that prevents shift shock and shortens the shift time when the second shift is directed during the operation of the first shift.

In order to achieve the aforementioned object, according to an embodiment of the invention, a shift control device for an automatic transmission comprises a plurality of frictional engagement elements that change a power transmission route between an input shaft, inputting power from an engine output shaft, and an output shaft connected to vehicle wheels, hydraulic servos that engage and disengage the plurality of frictional engagement elements, an adjusting device which adjusts a hydraulic pressure applied to a predetermined hydraulic servo, a control unit which outputs control signals to the adjusting device, process circumstances determining circuit which is in the control unit and determines process circumstances of a first shift at a determination of a second shift, when the second shift is determined during the shift control for the first shift, and a select circuit which is in the control unit and selects a shift pattern from a first shift pattern, wherein the operation of the first shift is interrupted and the automatic transmission is directly shifted to a ratio achieved by the second shift, and a second shift pattern, wherein the automatic transmission is shifted to a ratio achieved by the second shift after the end of the first shift, based on the detection of the process circumstances determining circuit.

The first shift is a clutch to clutch shift (in this expression clutch is generic to a frictional engagement element that may be either a clutch or brake as those terms are used elsewhere herein) wherein a first frictional engagement element is disengaged and a second frictional engagement element is engaged, the first frictional engagement element is disengaged and a third frictional engagement element is engaged in the first shift pattern, the second frictional engagement element is disengaged after engaging of the second frictional engagement element and a third frictional engagement element is engaged in the second shift pattern, and the adjusting device adjusts a hydraulic pressure applied to hydraulic servos for the first, second and third frictional engagement elements respectively.

The process circumstances determining circuit makes a determination, based on an engaging state of the one of the first frictional engagement element and the second frictional engagement element, of the process circumstances of the first shift at the determination of the second shift.

The process circumstances determining circuit makes a determination, based on the control signals applied to the adjusting device that control the hydraulic pressure applied to the hydraulic servo for the one of the first frictional engagement element and the second frictional engagement element, of the process circumstances of the first shift at the determination of the second shift.

The second shift pattern is selected when a control signal greater than a hydraulic pressure value, corresponding to a necessary torque allotment amount for the one of the first frictional engagement element and the second frictional engagement element, is output to the adjusting device.

The first shift pattern is selected when a control signal less than a hydraulic pressure value, corresponding to a necessary torque allotment amount for the first or second frictional engagement element, is output to the adjusting device.

The control unit determines the driving state of the vehicle from a power on state or a power off state, and the second shift pattern is selected irrespective of the process circumstances of the first shift when the driving state is in the power off state.

According to the invention, in the case that the shift shock based on, for example, the engine rewing may occur when the operation of the first shift is interrupted and the frictional engagement elements operated in the first shift are returned to a state before the first shift because the process circumstances of the first shift are in a late phase, the second shift is performed after the end of the first shift. Therefore, the shift shock is prevented. In the case that the shift shock will not occur when the operation of the first shift is interrupted and the frictional engagement elements operated in the first shift are returned to a state before the first shift because the process circumstances of the first shift are in an early phase, the first shift is interrupted and the second shift is started immediately. Therefore, the shift time is shortened.

When the shift, which is a clutch to clutch shift between frictional engagement elements, is performed, the engine revving and a tie up are prevented and the clutch to clutch shift between the frictional engagement elements is performed with the proper timing. The tie up is a state in which frictional engagement elements are engaged at the same time and a smooth rotation of a shaft in the transmission is disturbed.

The process circumstances of the first shift is determined based on the engagement state of the first or second frictional engagement element. Therefore, it is clear how much torque the frictional engagement element of one of disengagement side and engagement side have different from the case that the process circumstances is determined based on the input shaft rotation speed during the shift. As a result, the process circumstances of the first shift are accurately determined and the shift pattern to the gear ratio achieved by the second shift is accurately selected.

The engagement state of the one of the first and second frictional engagement elements is determined based on the control signal applied from the control unit to the adjusting device. Therefore, the state of the engagement is determined accurately and quickly without exclusive sensors and the attendant increase in cost.

When the first shift is in the late phase and the second frictional engagement element has enough torque, the second shift pattern is selected. The second shift is performed after disengaging the first frictional engagement element. A rotation change after the end of the first shift is absorbed with the second frictional engagement element. Therefore, a reduction in the durability of the first frictional engagement element is prevented. As a result, it is absolutely prevented that the reduction in the durability of the first frictional engagement element results based on increase in the frequency of using the first frictional engagement when the first shift is stopped in the state that the first shift is in the late phase. That is to say, it is absolutely prevented that a reduction in the durability of the first frictional engagement element occurs on the basis of the first frictional engagement element is engaged again in the state in which a rotation change amount is large due to disengagement of the first frictional engagement element in the first shift and based on the first frictional engagement element is again disengaged in the second shift.

When the process circumstances of the first shift is in the early phase, the rotation change amount based on disengagement of the first frictional engagement element is small. Therefore, the second shift is performed based on the first shift pattern after interrupting of the first shift. As a result, the durability of the first frictional engagement element is not reduced. Further, the shift time is shortened because the second shift is performed after the first shift is interrupted.

The rotation change is started by the engagement of the second frictional engagement element because the second shift pattern is selected irrespective of the process circumstances of the first shift. Therefore, a proper shift feeling without a time lag is achieved. In the case of the power off shift, the first shift does not proceed enough because the first frictional engagement element is not engaged and the rotation change does not occur. In this state, when the first shift is interrupted, the rotation change does not occur until the third frictional engagement element starts engagement in the second shift. Therefore, the time lag which gives a shift feeling to the driver is prevented.

BRIEF DESCRIPTION OF THE DRAWINGS

The invention will be described in conjunction with the following drawings in which like features are designated with like reference characters, and wherein:

FIG. 2 is a table showing the operation of the each frictional engagement element;

DETAILED DESCRIPTION OF THE INVENTION

The invention will become more apparent from the following detailed description of preferred embodiments with reference to the accompanying drawings.

Figure 1:
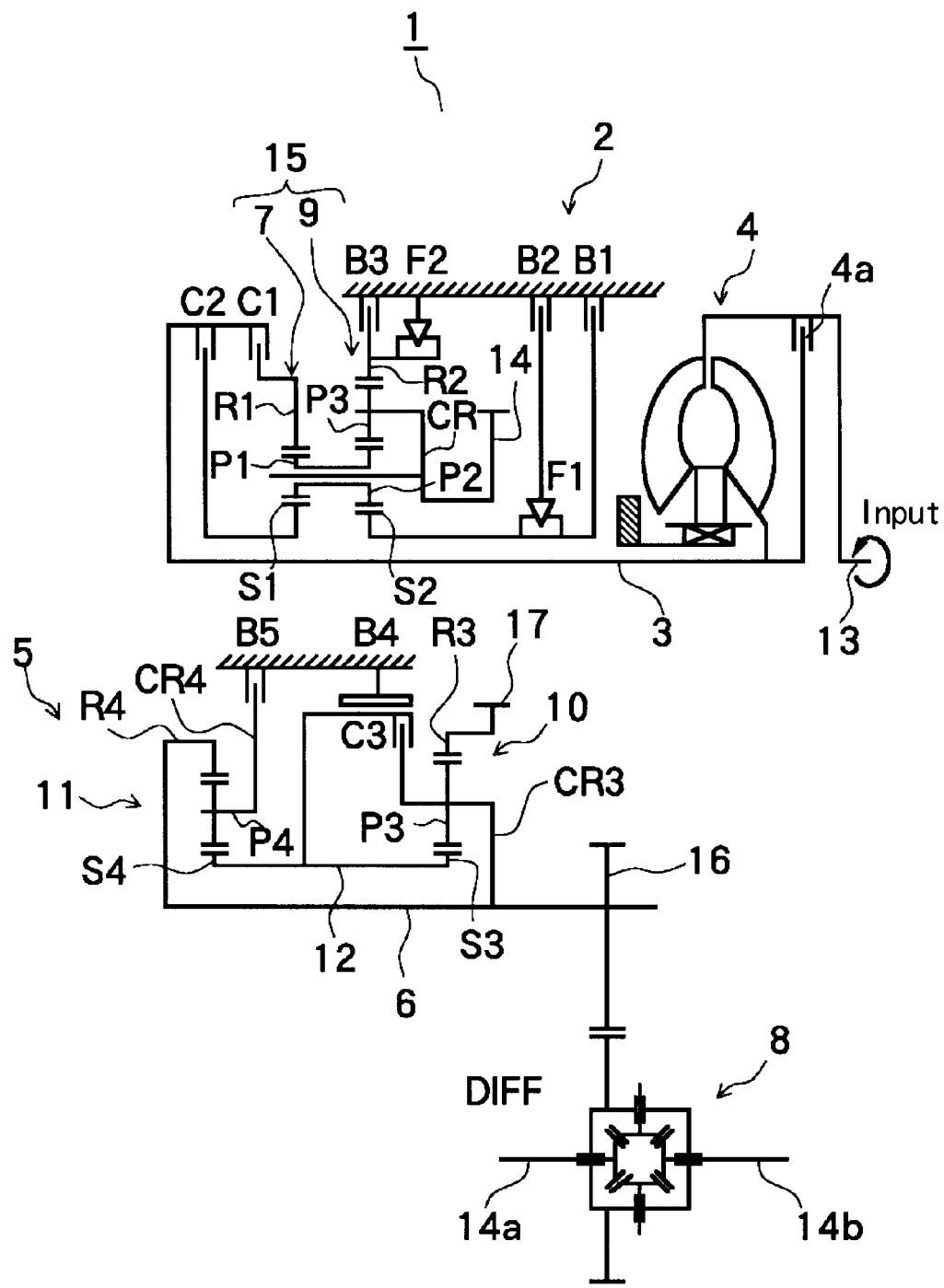
FIG. 1 is a schematic diagram illustrating a mechanical portion of an automatic transmission of the invention.

As shown in FIG. 1, a 5-speed automatic transmission 1 comprises a torque converter 4, a 3-speed main transmission mechanism 2, a 3-speed auxiliary transmission mechanism 5 and a differential unit 8. These components are connected to each other to form a single structure accommodated in a case. The torque converter 4, which is provided with a lock-up clutch 4a, receives torque from an engine crank shaft 13, supplying the torque to an input shaft 3 of the main transmission mechanism 2 through a hydraulic flow in the torque converter 4 or through the mechanical joint of the lock-up clutch 4a. The first shaft 3 (input shaft) aligned with the crank shaft, the second shaft 6 (counter shaft) arranged parallel to the first shaft 3, and the third shaft 14a, 14b (a left-right vehicle shaft) are rotatably supported in the case. A valve body is established on the outside of the case.

The main transmission mechanism 2 has a planetary gear unit 15 as a gear unit which comprises a simple planetary gear 7 and a double-pinion planetary gear 9. The simple planetary gear 7 comprises a sun gear S1, a ring gear R1 and a carrier CR for supporting a pinion P1. The pinion P1 is engaged with the sun gear S1 and ring gear R1. The double-pinion planetary gear 9 comprises the sun gear S2, having a different number of gear teeth than the sun gear S1, a ring gear R2 and the carrier CR shared with the simple planetary gear 7 for supporting the pinion P2 and a pinion P3 of the double-pinion planetary gear 9. The pinion P2 is engaged with the sun gear S2, and the pinion P3 is engaged with the ring gear R2.

The input shaft 3, which is associated with the crank shaft 13 through the torque converter 4, can be linked to the ring gear R1 of the simple planetary gear 7 through a first (forward) clutch C1 and to the sun gear S1 of the simple planetary gear 7 through a second (direct) clutch C2. The sun gear S2 of the double-pinion planetary gear 9 can be stopped from rotation directly by a first brake B1 as a first frictional engagement element and stopped by a second brake B2 as a second frictional engagement element through a first one-way clutch F1. The ring gear R2 of the double-pinion planetary gear 9 can be stopped from rotation by a third brake B3 and a second one-way clutch F2. The common carrier CR is linked to a counter drive gear 14, which serves as an output member of the main transmission mechanism 2.

The auxiliary transmission mechanism 5 comprises an output gear 16, a first simple planetary gear 10 as a gear unit and a second simple planetary gear 11 as a gear unit, which are arranged sequentially in the axial direction of the second shaft 6 serving as a counter shaft toward the rear side. The counter shaft 6 is rotatably supported by the case through a bearing. The first and second simple planetary gears 10, 11 are both of the Simpson type.

As for the first simple planetary gear 10, a ring gear R3 is connected to a counter driven gear 17, which is engaged with the counter drive gear 14. A sun gear S3 is fixed to a sleeve shaft 12, which is rotatably supported by the counter shaft 6. A pinion P3 is supported by a carrier CR3, and a flange of the carrier CR3 has an end thereof connected to the counter shaft 6 to form an assembly. The other end of the carrier CR3 is connected to an inner hub of a third (UD direct) clutch C3. As for the second simple planetary gear 11, a sun gear S4 is formed on the sleeve shaft 12 and connected to the sun gear S3 of the first simple planetary gear 10. A ring gear R4 is linked to the counter shaft 6.

The UD direct clutch C3 is provided between the carrier CR3 and the sleeve shaft 12 connecting the sun gear S3 to the sun gear S4. The sun gear S3 and the sun gear S4 can be stopped from rotation by a fourth brake B4 serving as a band brake. A carrier CR4 supporting a pinion P4 of the second simple planetary gear 11 can be stopped by a fifth brake B5.

Next, operation of the mechanisms of the 5-speed automatic transmission will be explained with reference to FIGS. 1 and 2.

At a first ratio of the automatic transmission 1 in the D (drive) range, the forward clutch C1 is engaged, and the fifth brake B5 and the second one-way clutch F2 are also engaged, operating so as to maintain the ring gear R2 of the double-pinion planetary gear 9 and the carrier CR4 of the second simple planetary gear 11 in the stopped state. In this state, the rotation of the input shaft 3 is transmitted to the ring gear R1 of the simple planetary gear 7 through the forward clutch C1. In addition, since the ring gear R2 of the double-pinion planetary gear 9 is stopped, the common carrier CR is rotated in the positive direction at a substantially reduced rotational speed, while the sun gear S1 and the sun gear S2 are in a rotating state in the reverse direction. That is to say, the main transmission mechanism 2 is in the state of a first gear ratio thereof and the rotation at the reduced rotational speed is transmitted to the ring gear R3 of the first simple planetary gear 10 in the auxiliary transmission mechanism 5 through the counter gears 14, 17. With the carrier CR4 of the second simple planetary gear 11 stopped, the auxiliary transmission mechanism 5 is also in the state of a first gear ratio thereof. In this state, the rotation of the main transmission mechanism 2 at the reduced rotational speed is further slowed down by the auxiliary transmission mechanism 5 and outputted from an output gear 16.

At a second ratio of the automatic transmission 1, the second brake B2 (or the first brake B1) is engaged in addition to the engagement of the forward clutch C1. Further, the engagement is switched over from the second one-way clutch F2 to the first one-way clutch F1 and the fifth brake B5 is maintained in the engaging state. In this state, the sun gear S2 is stopped from rotation by the second brake B2 and the first one-way clutch F1. As a result, the rotation of the ring gear R1 of the simple planetary gear 7, transmitted from the input shaft 3 through the forward clutch C1, causes the carrier CR to rotate in the positive direction while keeping the ring gear R2 of the double-pinion planetary gear 9 in a free rotating state in the positive direction. In addition, the rotation at the reduced rotational speed is transmitted to the auxiliary transmission mechanism 5 through the counter gears 14, 17. That is to say, the main transmission mechanism 2 is in the state of a second gear ratio thereof while the auxiliary transmission mechanism 5 is in the state of the first gear ratio thereof due to the engagement of the fifth brake B5. As a result of combining the state of the second gear ratio of the main transmission mechanism 2 and the state of the first gear ratio of the auxiliary transmission mechanism 5, the second ratio is obtained in the automatic transmission 1 as a whole. At that time, the first brake B1 may be engaged when the sequence of the engagement of the first brake B1 and the second brake B2 is changed based on a load state as described later.

At a third ratio of the automatic transmission 1, the forward clutch C1, the second brake B2, the first one-way clutch F1 and the first brake B1 are maintained in the engaged state. In addition, the engagement of the fifth brake B5 is released while, at the same time, the fourth brake (band brake) B4 is engaged. That is to say, the main transmission mechanism 2 is sustained in the second ratio state and the rotation at the second ratio is transmitted to the auxiliary transmission mechanism 5 through the counter gears 14, 17. In addition, in the auxiliary transmission mechanism 5, the rotation from the ring gear R3 of the first simple planetary gear 10 is output from the carrier CR3 as a rotation at a second gear ratio thereof due to the fact that the sun gear S3 is stopped. As a result of combining the state of the second gear ratio of the main transmission mechanism 2 and the state of the second gear ratio of the auxiliary transmission mechanism 5, the third ratio is obtained in the automatic transmission 1 as a whole.

At a fourth ratio of the automatic transmission 1, the main transmission mechanism 2 is in the same state as the above states at the second and third ratios of the automatic transmission 1 wherein the forward clutch C1, the second brake B2, the first one-way clutch F1 and the first brake B1 are engaged. In the auxiliary transmission mechanism 5, on the other hand, the fourth brake (band brake) B4 is disengaged while the UD direct clutch C3 is engaged. In this state, the carrier CR3, the sun gear S3 of the first simple planetary gear 10 and the sun gear S4 of the second simple planetary gear 11 are connected, putting the first and second simple planetary gears 10, 11 in a directly-coupled state wherein the first and second simple planetary gears 10, 11 both rotate integrally. As a result of combining the state of the second gear ratio of the main transmission mechanism 2 and the state of a third gear ratio, that is, the directly-coupled state, of the auxiliary transmission mechanism 5, a rotation of the fourth ratio in the automatic transmission 1 as a whole is outputted from the output gear 16.

At a fifth ratio of the automatic transmission 1, the forward clutch C1 and the direct clutch C2 are engaged and the rotation of the input shaft 3 is transmitted to the ring gear R1 and the sun gear S1 of the simple planetary gear 7. The main transmission mechanism 2 is thus in a directly-coupled state wherein the planetary gear unit 15 rotates integrally. In addition, the auxiliary transmission mechanism 5 is in a directly-coupled state with the third (UD direct) clutch C3 engaged. As a result of combining the state of a third gear ratio, that is, the directly-coupled state of the main transmission mechanism 2 and the state of the third gear ratio, that is, the directly-coupled state of the auxiliary transmission mechanism 5, a rotation at the fifth ratio in the automatic transmission 1 as a whole is output from the output gear 16.

Additionally, the automatic transmission 1 also has intermediate ratios, that is, a third low ratio and a fourth low ratio which are operated during a down shift for acceleration, for example.

At the third low ratio, the forward clutch C1 and the direct clutch C2 are engaged. Actually, the second brake B2 is also engaged but is over-run by the one-way clutch F1. The main transmission mechanism 2 is in a state of the third gear ratio thereof with the planetary gear unit 15 thereof directly coupled. On the other hand, the fifth brake B5 is engaged, putting the auxiliary transmission mechanism 5 in a state of the first gear ratio thereof. As a result of combining the state of the third gear ratio of the main transmission mechanism 2 and the state of the first gear ratio of the auxiliary transmission mechanism 5, a ratio between the second and third ratios, that is, the third low ratio aforementioned is obtained in the automatic transmission 1 as a whole.

At the fourth low ratio, the forward clutch C1 and the direct clutch C2 are engaged, putting the main transmission mechanism 2 in a state of the third gear ratio thereof with the planetary gear unit 15 thereof put in a directly-connected-rotation state as is the case with the state of the third low ratio. On the other hand, the fourth brake (band brake) B4 is engaged and the sun gear S3 of the first simple planetary gear 10 is stopped, putting the auxiliary transmission mechanism 5 in a state of the second gear ratio thereof. As a result of combining the state of third gear ratio of the main transmission mechanism 2 and the state of the second gear ratio of the auxiliary transmission mechanism 5, a ratio between the third and fourth ratios, that is, the fourth low ratio aforementioned is obtained in the automatic transmission 1 as a whole.

It should be noted that each dotted-line circle shown in FIG. 2 indicates that a coasting engine brake is working. That is to say, at the first ratio, the third brake B3 is engaged for stopping the rotation of the ring gear R2 through engagement of the second one-way clutch F2. In addition, at the second, the third, and the fourth ratios, the first brake B1 is engaged, stopping from the rotation of the sun gear S1 caused by an over-run of the first one-way clutch F1.

In the R (reverse) range, the direct clutch C2 and the third brake B3 are both engaged and, at the same time, the fifth brake B5 is also engaged as well. In this state, the rotation of the input shaft 3 is transmitted to the sun gear S1 of the simple planetary gear 7 through the direct clutch C2, and the ring gear R2 of the double-pinion planetary gear 9 is stopped by the third brake B3. As a result, while the ring gear R1 of the simple planetary gear 7 is put in a rotation state in the reverse direction, the carrier CR is also rotated in the reverse direction. This rotation in the reverse direction is transmitted to the auxiliary transmission mechanism 5 through the counter gears 14, 17. The carrier CR4 of the second simple planetary gear 11 is stopped also in the reverse rotational direction by the fifth brake B5, maintaining the auxiliary transmission mechanism 5 in the state of the first gear ratio thereof. As a result of combining the rotation of the main transmission mechanism 2 in the reverse direction and the rotation of the auxiliary transmission mechanism 5 at the first gear ratio, a rotation at a reduced rotational speed in the reverse direction is outputted from the output gear 16.

Figure 3:
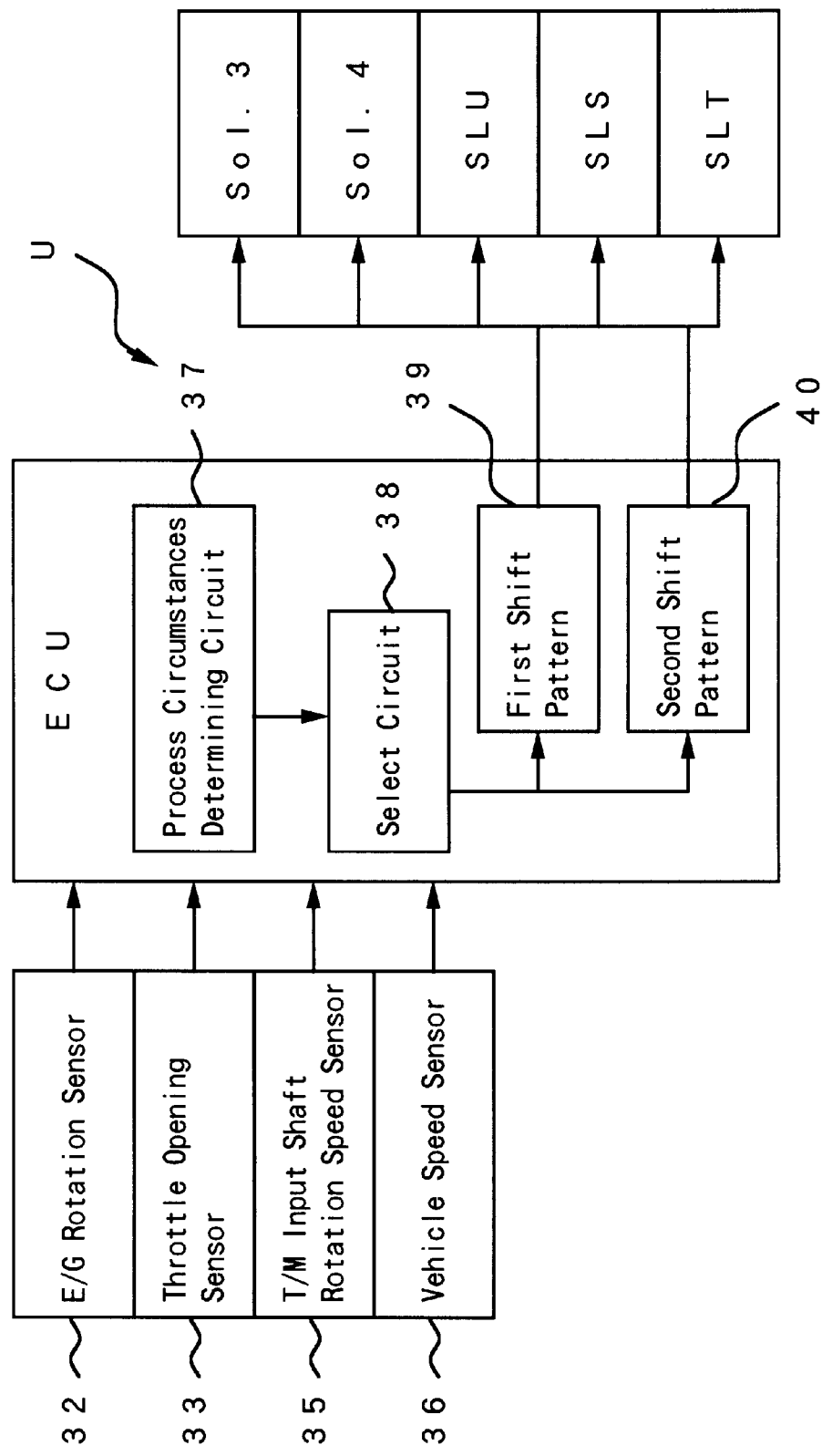
FIG. 3 is a block diagram showing the electrical control device.

FIG. 3 is a block diagram showing an electrical control system. U represents an electrical control unit including a micro computer. The electrical control unit U receives input signals from an engine rotation sensor 32, a throttle opening sensor 33, a transmission input shaft rotation speed (turbine rotation speed) sensor 35, and a vehicle speed (transmission output shaft rotation speed) sensor 36. The electrical control unit U outputs signals to a solenoid valves Sol. 3, Sol. 4, and linear solenoid valves SLU, SLS and SLT as adjusting devices in a hydraulic circuit. The electric control unit U includes a process circumstances determining circuit 37 which determines the process circumstances of the first shift when the second shift (the shift to second ratio) is to occur during control of the first shift (the shift from fourth ratio to third ratio), and a select circuit 38 which selects from a first shift pattern 39 and a second shift pattern 40 based on the determination of the process circumstances determining circuit. When the first shift pattern 39 is selected, the operation of the first shift is interrupted, and the gear ratio is directly shifted to the gear ratio which achieved by the second shift. When the second shift pattern 40 is selected, the gear ratio is shifted to the gear ratio of the second shift after the end of the operation of the first shift.

Figure 4:
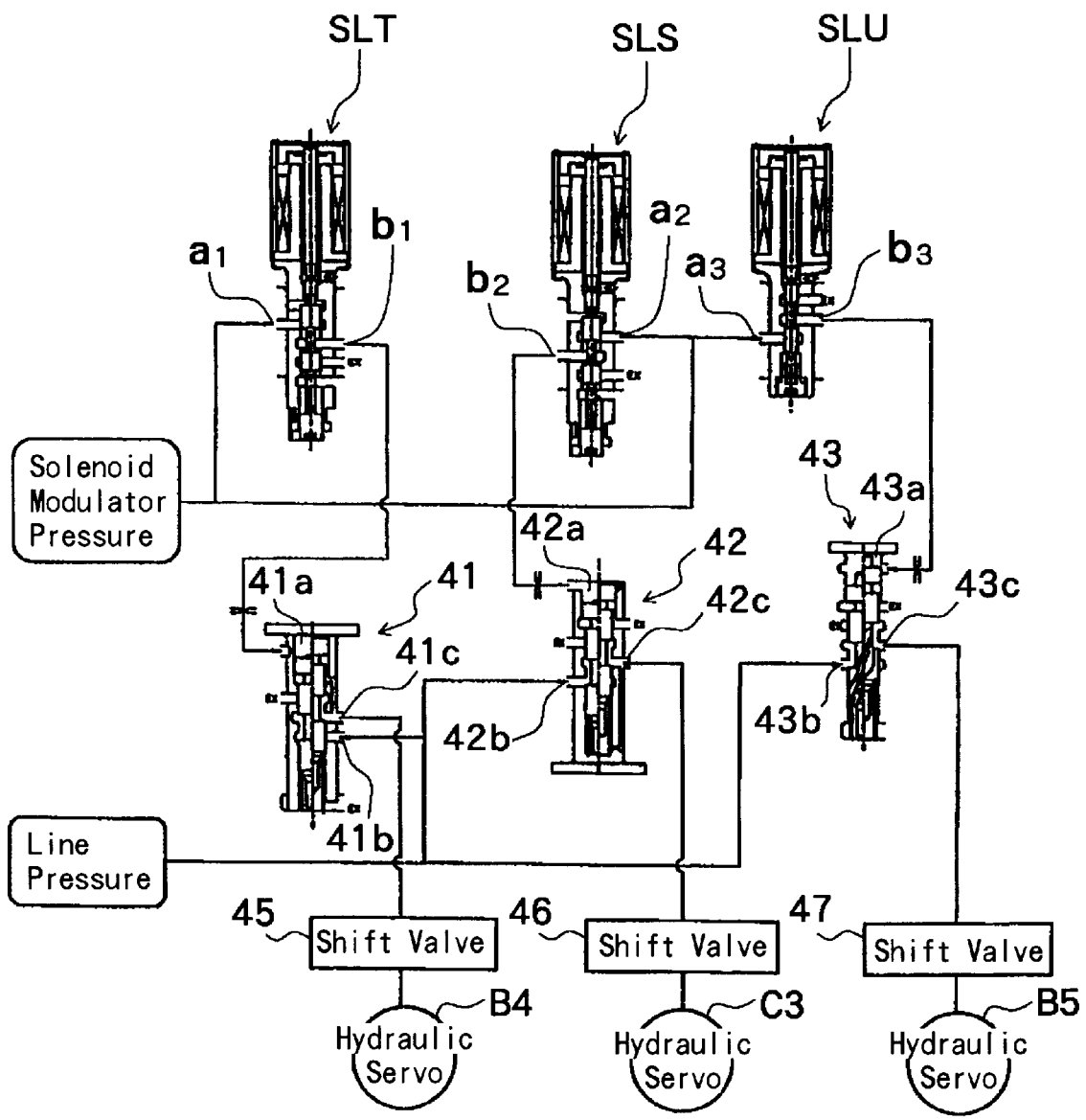
FIG. 4 is a summary diagram showing the hydraulic circuit.

FIG. 4 is a diagram showing an outline of the hydraulic circuit. The hydraulic circuit includes the three linear solenoid valves SLT, SLS and SLU, and a plurality of hydraulic servos B4, C3, B5, that change a transmission route of the planetary gear units in an automatic transmission. For example, the plurality of hydraulic servos engage and disengage a plurality of frictional engagement elements (clutches and brakes) for achieving the five forward ratios and the backward ratio as previously discussed. Solenoid modulator pressures are applied to input ports of the linear solenoid valves SLT, SLS and SLU. Control pressures are applied from output ports $b_1$, $b_2$, $b_3$ of the linear solenoid valves SLT, SLS, SLU to control chambers 41a, 42a, 43a of pressure control valves 41, 42, 43 respectively. Line pressures are applied to input ports 41b, 42b, 43b of the pressure control valves 41, 42, 43, and adjusted pressures that are adjusted based on the control pressures are applied from output ports 41c, 42c, 43c of the pressure control valves 41, 42, 43 to hydraulic servos B4, B5, C3 properly through shift valves 45, 46, 47 respectively.

This hydraulic circuit shows a basic structure. The hydraulic servos B4, C3, B5 are shown as the servos relating to the embodiment. Actually, there are many hydraulic servos corresponding to the frictional engagement elements C1, C2, C3, B1, B2, B3, B5 in the automatic transmission mechanism. There are also many shift valves for shifting pressures applied to the hydraulic servos. Each shift valve is shifted based on the solenoid valves that are switched between ON and OFF. FIG. 3 shows only solenoid valves Sol. 3, Sol. 4 that correspond to the hydraulic servos B4, C3, B5.

Figure 5:
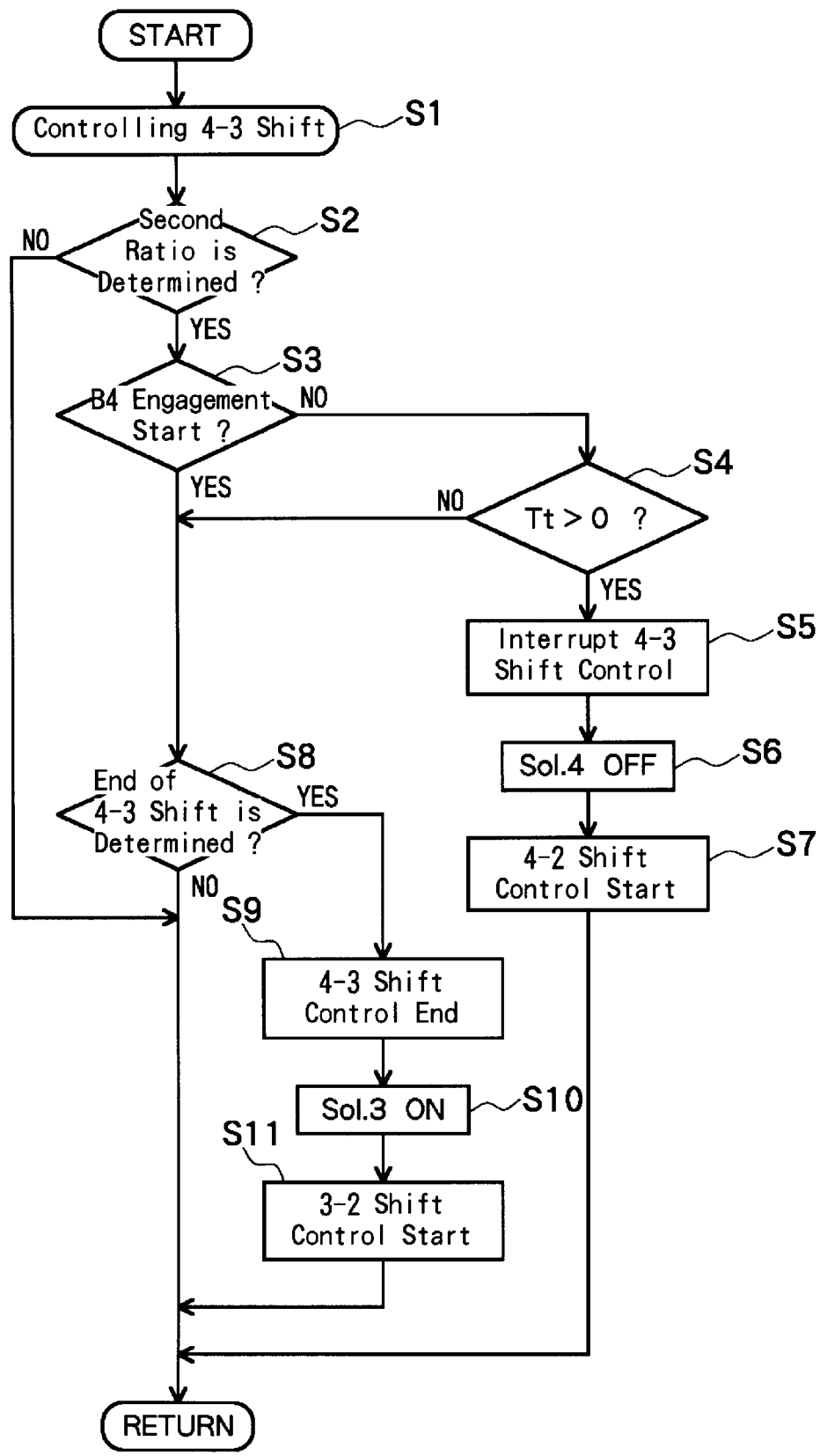
FIG. 5 is a flow chart showing the multiplex shift control in the embodiment of the invention.

The embodiment of the invention will be described with reference to the flow chart of FIG. 5.

A shift from fourth ratio to third ratio is determined by a map stored in the electrical control unit U based on signals coming from the throttle opening sensor 33 and the vehicle speed sensor 36, and the shift control for the shift from fourth ratio to third ratio is started (S1). The down shift includes a power on down shift which occurs when, for example, a driver operates an accelerator pedal and a torque is required, and power off down shift occurs when, for example, the driver operates a brake pedal and the vehicle is decelerated. The power on down shift will be described.

The down shift from fourth ratio to third ratio is achieved by disengaging the UD direct clutch C3 as a first frictional engagement element and engaging the fourth brake B4 as a second frictional engagement element. When the shift control for the shift from fourth ratio to third ratio is started, the linear solenoid valve SLS is controlled based on the signal from the electrical control unit U, and a hydraulic pressure $P_{C3}$ applied from the pressure control valve 42 to hydraulic servo C3 is adjusted to a keeping pressure $P_T$ with which the UD direct clutch C3 is not relatively rotated. At that time, the keeping pressure is calculated based on an allotment rate of disengagement corresponding to the input torque. The hydraulic pressure $P_{C3}$ is decreased over time ($\delta P_A$) from the keeping pressure $P_T$ to a target disengagement pressure based on a target rotation changing rate at the start of a rotation change of a input shaft rotation speed $N_T$. A feedback control is performed so that the changing rate of the input shaft rotation speed reaches a predetermined value. The hydraulic pressure $P_{C3}$ for the UD direct clutch C3 is decreased over time by the linear solenoid valve SLS.

At the same time, with the start of the shift control for the shift from fourth ratio to third ratio, the solenoid valve Sol. 4 is turned ON, and the shift valve 45 is shifted so that the hydraulic pressure is applied from the pressure control valve 41 to the hydraulic servo B4. At the same time, the linear solenoid valve SLT adjusts the hydraulic pressure $P_{B4}$ for the fourth brake which is engaged in this shift. At the same time with the start of the shift control for the shift from fourth ratio to third ratio, the control pressure $P_{B4}$ is set at a predetermined pressure $P_{S1}$ which is needed to fill the hydraulic chamber of the hydraulic servo B4. When a piston in the hydraulic servo is stroked by the predetermined pressure $P_{S1}$ and frictional pads contact each other, the control pressure $P_{B4}$ is decreased over time to a predetermined keeping low pressure $P_{S2}$ and kept at the predetermined keeping low pressure $P_{S2}$ until a predetermined time $t_{SE}$ has elapsed from the shift start. The predetermined keeping low pressure $P_{S2}$ is more than the pressure for the piston stroke and set so that the brake B4 does not have a torque capacity. A servo activating control (a piston stroke control) for the frictional engagement element B4 of engagement side is performed until the predetermined time $t_{SE}$ has elapsed from the start of the shift from fourth ratio to third ratio.

When the predetermined time $t_{SE}$ for the servo activating control has elapsed, the control pressure $P_{B4}$ is increased over time ($\delta P_B$) based on an allotment rate of a torque for the fourth brake B4 which is engaged in this shift corresponding to the decrease ($\delta P_A$) of the hydraulic pressure $P_{C3}$ for the UD direct clutch which is disengaged in this shift. Then, the hydraulic pressure $P_{B4}$ for the fourth brake B4 reaches an engagement target pressure $P_{TB}$ that corresponds to a torque allotment amount needed for engagement calculated based on the torque allotment rate and the input torque. Then, the engagement of the fourth brake B4 is started. Further, the hydraulic pressure $P_{B4}$ is increased, for increasing the torque capacity of the brake B4, and engages the brake B4 completely.

During the control for the down shift from fourth ratio to third ratio which is the first shift (S1), when the shift to second ratio which is the second shift is determined by, for example, a kick down (S2), it is determined whether the fourth brake B4 has started to engage, that is to say, it is determined whether the time $t_{SE}$ for the servo activating control has elapsed, whether an increasing signal $\delta P_B$ is output from the control unit U to the linear solenoid valve SLT, and whether the control pressure $P_{B4}$ has reached the target pressure $P_{TB}$ for engagement at the time in which the shift to second ratio is determined (S3).

Figure 6:
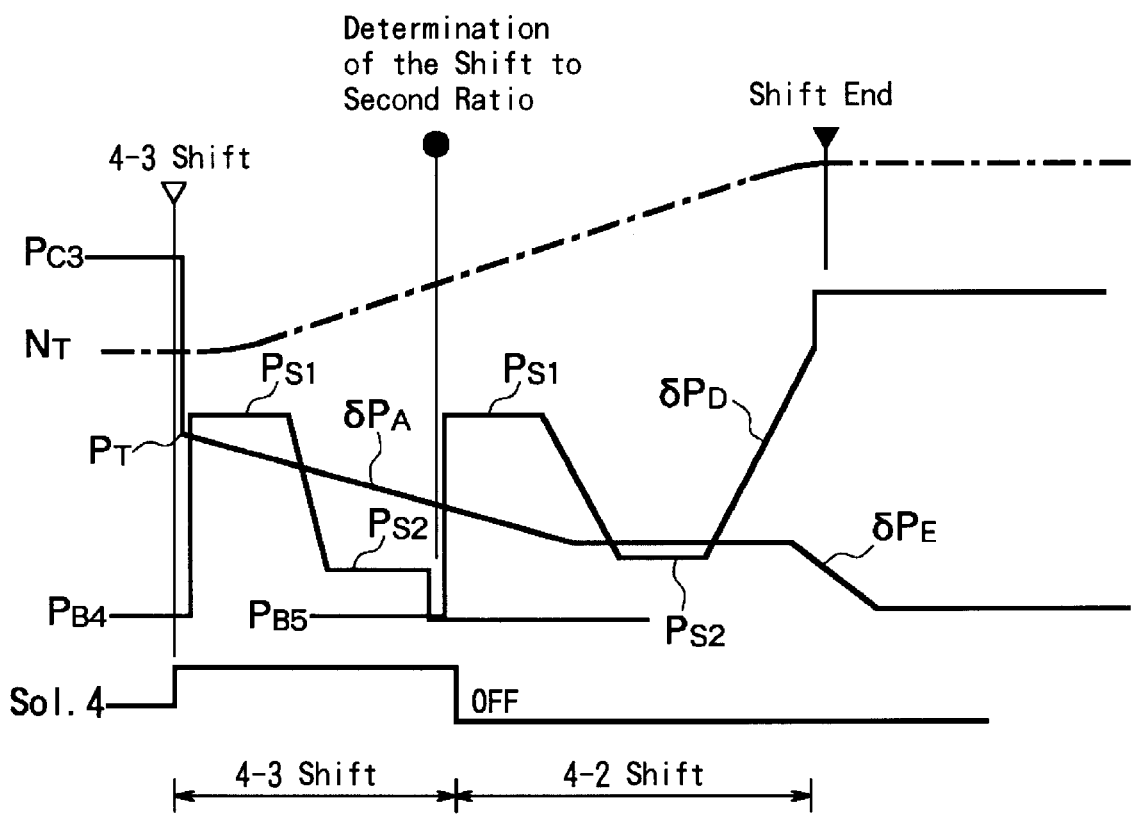
FIG. 6 is a timing chart showing the shift control based on the first shift pattern.

In the case where the fourth brake B4 has not started engagement, for example, as shown in FIG. 6, the second ratio is determined during the servo activating control, it is determined whether the input torque is a positive value or a negative value. That is to say, it is determined that the automatic transmission is in the power on state or the power off state (S4). Because it is in a positive (power on, i.e., rapid acceleration) state, the shift control for the shift from fourth ratio to third ratio is interrupted immediately (S5),and the solenoid valve Sol. 4 is turned to OFF (the first shift pattern) (S6). Therefore, the shift valve 45 is shifted so that the hydraulic pressure $P_{B4}$ for the hydraulic servo B4 for the fourth brake is drained.

Then the shift control for the shift from fourth ratio directly to second ratio is started (S7). In the down shift from fourth ratio to second ratio, the UD direct clutch C3, the engaged frictional engagement element is controlled for disengagement, and the frictional engagement element to be engaged is changed from the fourth brake B4 to the fifth brake B5. Therefore, the linear solenoid valve SLS controls the hydraulic pressure $P_{C3}$ for the UD direct clutch to continue decreasing over time ($\delta P_A$). Further, at the same time with the start of the shift control for the shift from fourth ratio to second ratio, the linear solenoid valve SLU is controlled so that a hydraulic pressure $P_{B5}$ applied from the pressure control valve 43 to the hydraulic servo B5 reaches the piston stroke pressure $P_{S1}$. Further, the hydraulic pressure $P_{B5}$ (FIG. 6) is decreased over time at a predetermined rate, after the servo activating control in which the hydraulic pressure $P_{B5}$ is kept at the predetermined low pressure $P_{S2}$, the hydraulic pressure $P_{B5}$ is increased over time ($\delta P_D$) and the engagement control is started.

At that time, the hydraulic pressure $P_{C3}$ for the UD direct clutch is decreased over time with a large rate of a change $\delta P_E$, and the UD direct clutch C3 is disengaged completely after waiting for a predetermined time according to the servo activating control. The hydraulic pressure $P_{B5}$ for the fifth brake starts engagement of the fifth brake B5 by increase $\delta P_D$, increasing the pressure at a rate increasing the torque capacity of the fifth brake B5, and engages the fifth brake B5 completely. The shift to second ratio is ended, and the input shaft rotation speed $N_T$ synchronizes with the rotation speed which is achieved in second ratio.

Figure 7:
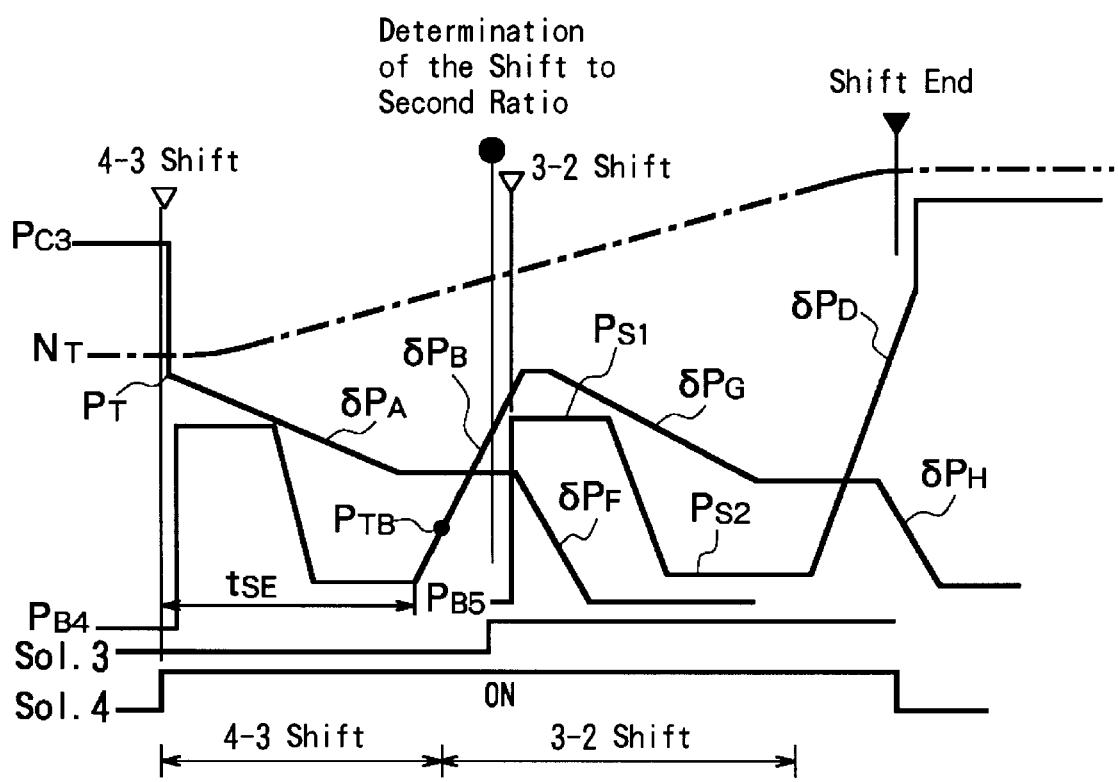
FIG. 7 is a timing chart showing the shift control based on the second shift pattern.

At the step S3, in the case that the shift to the second ratio is determined after the start of the engagement of the fourth brake B4, for example, as shown in FIG. 7, in the case that the shift to second ratio is determined in the state in which the hydraulic pressure $P_{B4}$ for the fourth brake is increased over the target pressure $P_{TB}$, the down shift from fourth ratio to third ratio is continued (during the second shift pattern). Then, the fourth brake B4 is engaged completely by the increase of the hydraulic pressure $P_{B4}$. The input shaft rotation speed $N_T$ synchronizes with the rotation achieved in third ratio. The end of the shift from fourth ratio to third ratio is determined (S8), and the shift from fourth ratio to third ratio is ended (S9).

The solenoid valve Sol. 3 is turned to ON, the shift valve 47 is shifted so that the hydraulic pressure is applied from the pressure control valve 43 to the hydraulic servo B5 (S10). Then, a shift control for the down shift from third ratio to second ratio, based on a disengagement of the fourth brake B4 and the engagement of the fifth brake B5 is started (S11). At that time, the hydraulic servo $P_{C3}$ for the UD direct clutch is decreased ($\delta P_F$) rapidly at the same time as the start of the shift from third ratio to second ratio, and the UD direct clutch C3 is disengaged completely.

The solenoid valve Sol. 4 is kept in the ON state and the hydraulic servo B4 receives the adjusted pressure from the pressure control valve 41. Then, the control pressure $P_{B4}$ applied from the linear solenoid valve SLS is decreased over time ($\delta P_G$) corresponding to the input torque and the input torque of disengagement based on the allotment rate of the torque of disengagement. The torque capacity of the fourth brake B4 is decreased gradually from the engaged state.

The control pressure $P_{B5}$ applied from the linear solenoid valve SLU is increased ($\delta P_D$) and controlled engagement occurs after the servo activating control by the piston stroke pressure $P_{S1}$ and the predetermined low pressure $PS_2$. Then, the fourth brake B4 is disengaged completely by a rapid decrease ($\delta P_H$) of the hydraulic pressure $P_{B4}$, and the fifth brake B5 is engaged completely by an increase ($\delta P_D$) of the hydraulic pressure $P_{B5}$. The input shaft rotation speed $N_T$ synchronizes with the rotation achieved in second ratio, and the shift from third ratio to second ratio is ended.

Figure 8:
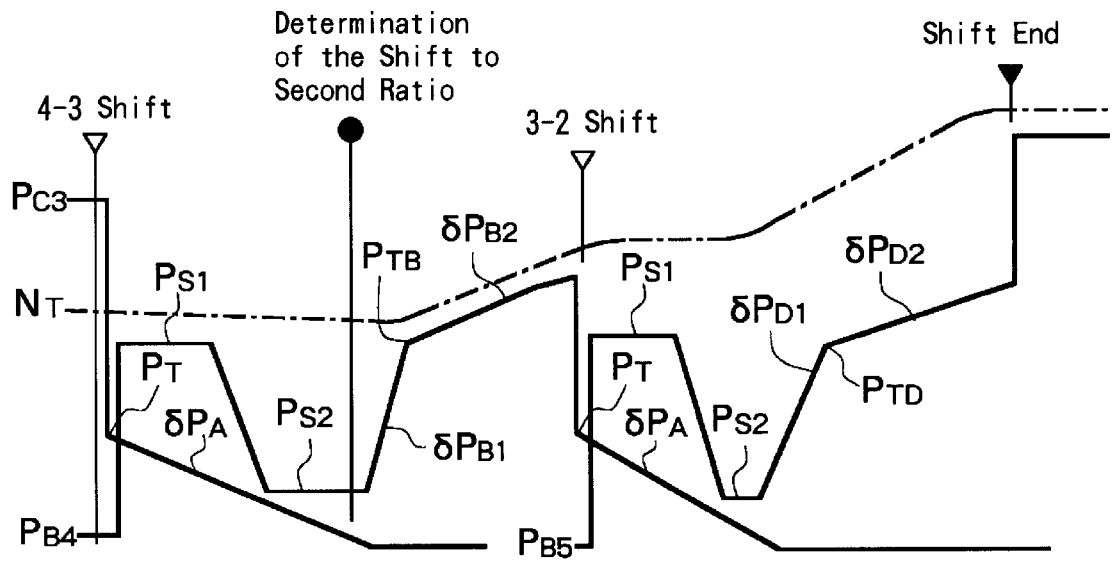
FIG. 8 is a timing chart showing the shift control based on the power off down shift.

In the case that the input torque $T_T$ is a negative value ($T_T<0$) at the step S4, that is to say, it is in power off state, in which the vehicle is decelerated rapidly by the operation of the brake pedal, the shift control for the shift from fourth ratio to third ratio is continued until a determination of the end of the shift from fourth ratio to third ratio is made. That is to say, as shown in FIG. 8, even when the hydraulic pressure $P_{C3}$ for the UD direct clutch is controlled for disengagement and the shift to second ratio is determined during the servo activating control of the hydraulic pressure $P_{B4}$ for the fourth brake, the hydraulic pressure $P_{B4}$ is increased over time after the servo activating control. At that time, the increase has a first increase rate of $\delta P_{B1}$ and a second increase rate of $\delta P_{B2}$. In the first increase rate of $\delta P_{B1}$, the hydraulic pressure $P_{B4}$ is increased toward the target pressure $P_{TB}$ with which the input shaft rotation speed $N_T$ is changed. The second increase $\delta P_{B2}$ occurs by a feedback control so that a change rate of the input shaft rotation speed $N_T$ reaches a predetermined value after changing the input shaft rotation speed $N_T$.

Then, the fourth brake B4 is engaged completely, the input shaft rotation speed $N_T$ synchronizes with the gear ratio of third ratio, and the end of the shift from fourth ratio to third ratio is determined (S8). The shift from fourth ratio to third ratio is ended (S9). The shift from third ratio to second ratio is started (S10, S11). In the shift from third ratio to second ratio, the hydraulic pressure $P_{B4}$ for the fourth brake is reduced from the pressure in the engagement state to a keeping pressure with which the fourth brake B4 has a predetermined torque capacity, further, the hydraulic pressure $P_{B4}$ is decreased over time ($\delta P_A$), the torque capacity of the fourth brake B4 is decreased gradually, and the fourth brake B4 is disengaged completely. The hydraulic pressure $P_{B5}$ for the fifth brake is increased over time ($\delta P_{D1}$) toward a target pressure $P_{TD}$ after the servo activating control. This is a first increase. Further, the hydraulic pressure $P_{B5}$ is increased over time ($\delta P_{D2}$) by the feedback control based on the change rate of the input shaft rotation speed $N_T$. The torque capacity of the fifth brake B5 is increased gradually and the fifth brake B5 is engaged completely. The input shaft rotation speed $N_T$ synchronizes with the rotation achieved in the second ratio, and the shift from the third ratio to the second ratio is ended.

In the aforementioned embodiment, the first and the second shift pattern is determined and selected based on the hydraulic pressure $P_{B4}$ for the fourth brake as it is engaged. But it may be determined based on the hydraulic pressure $P_{C3}$ for the UD direct clutch as it is disengaged because the hydraulic pressure for engagement and the hydraulic pressure for disengagement have a relationship with each other. Further, the described action is for the determination of the shift to the second ratio during the shift from the fourth ratio to the third ratio. But it may be applied to a determination of any other shift during a first shift control.

What is claimed is:

1. A shift control device for an automatic transmission, comprising:

a plurality of frictional engagement elements that change a power transmission line between an input shaft inputting power from an engine output shaft and an output shaft connected to vehicle wheels;

a plurality of hydraulic servos, a hydraulic servo that engages and disengages each frictional engagement element of the plurality of frictional engagement elements;

an adjusting device which adjusts a hydraulic pressure applied to a predetermined hydraulic servo;

a control unit which outputs control signals to the adjusting device;

a process circumstances determining device in the control unit, the process circumstances determining device determines process circumstances of a first shift at a determination of a second shift, when the second shift is determined during the shift control for the first shift; and a select device in the control unit, the select device selects a shift pattern from a first shift pattern, wherein the operation of the first shift is interrupted and the automatic transmission is directly shifted to a ratio achieved by the second shift, and a second shift pattern, wherein the automatic transmission is shifted to a ratio achieved by the second shift after the end of the first shift, based on the detection of the process circumstances determining circuit.

2. The shift control device for the automatic transmission according to claim 1, wherein the first shift is a clutch to clutch shift wherein a first frictional engagement element is disengaged and a second frictional engagement element is engaged, the first frictional engagement element is disengaged and a third frictional engagement element is engaged in the first shift pattern, the second frictional engagement element is disengaged after engaging of the second frictional engagement element and the third frictional engagement element is engaged in the second shift pattern, and the adjusting device adjusts the hydraulic pressure applied to hydraulic servos for the first, second and third frictional engagement elements respectively.

3. The shift control device for the automatic transmission according to claim 2, wherein the process circumstances determining device makes a determination based on an engaging state of the one of the first frictional engagement element and the second frictional engagement element.

4. The shift control device for the automatic transmission according to claim 3, wherein the process circumstances determining device makes the determination based on the control signals applied to the adjusting device that controls the hydraulic pressure applied to the hydraulic servo for the one of the first frictional engagement element and the second frictional engagement element.

5. The shift control device for the automatic transmission according to claim 4, wherein the second shift pattern is selected when the control signal, which represents the hydraulic pressure, represents more than a hydraulic pressure value corresponding to a necessary torque allotment amount for the one of the first frictional engagement element and the second frictional engagement element is output to the adjusting device.

6. The shift control device for the automatic transmission according to claim 4, wherein the first shift pattern is selected when the control signal, which represents the hydraulic pressure, represents less than a hydraulic pressure value corresponding to a necessary torque allotment amount for the first or second frictional engagement element is output to the adjusting device.

7. The shift control device for the automatic transmission according to claim 1, wherein the control unit determines a driving state of the vehicle from a power on state or a power off state, and the second shift pattern is selected irrespective of the process circumstances of the first shift when the driving state is in the power off state.

8. The shift control device for the automatic transmission according to claim 2, wherein the control unit determines a driving state of the vehicle from a power on state or a power off state, and the second shift pattern is selected irrespective of the process circumstances of the first shift when the driving state is in the power off state.

9. The shift control device for the automatic transmission according to claim 3, wherein the control unit determines a driving state of the vehicle from a power on state or a power off state, and the second shift pattern is selected irrespective of the process circumstances of the first shift when the driving state is in the power off state.

10. The shift control device for the automatic transmission according to claim 4, wherein the control unit determines a driving state of the vehicle from a power on state or a power off state, and the second shift pattern is selected irrespective of the process circumstances of the first shift when the driving state is in the power off state.

11. A shift control device for an automatic transmission of a vehicle, comprising:

a plurality of frictional engagement elements that change a route of power transmitted from an engine to drive wheels of the vehicle;

a hydraulic servo corresponding to each frictional engagement element of the plurality of engagement elements, the hydraulic servo engaging and disengaging the corresponding frictional engagement element;

an adjustment mechanism that adjusts hydraulic pressure applied to each hydraulic servo; and a control unit providing control signals to the adjustment mechanism for adjustment of the hydraulic pressure applied to each hydraulic servo, the control unit comprising:

a process state determining unit that determines the progress in executing a first shift upon command of a second shift; and a shift pattern selection unit which selects a first shift pattern to interrupt the first shift and execute the second shift and a second shift pattern to execute the second shift upon completion of the first shift based on the progress in the first shift determined by the progress state determining unit.

12. The shift control device according to claim 11, wherein the first shift pattern comprises disengaging a first frictional engagement element and engaging a second frictional engagement element.

13. The shift control device according to claim 11, wherein the second shift pattern comprises disengaging a first frictional engagement element and engaging a second frictional engagement element, followed by disengaging the second frictional engagement element and engaging a third frictional engagement element.

14. The shift control device according to claim 12, wherein the second shift pattern comprises disengaging the first frictional engagement element and engaging a third frictional engagement element, followed by disengaging the third frictional engagement element and engaging the second frictional engagement element.

* * * * *